H. BROWN.
POWER WHIP FOR HAY PRESSES.
APPLICATION FILED JULY 11, 1911.
1,029,586.
Patented June 18, 1912.
2 SHEETS—SHEET 1.
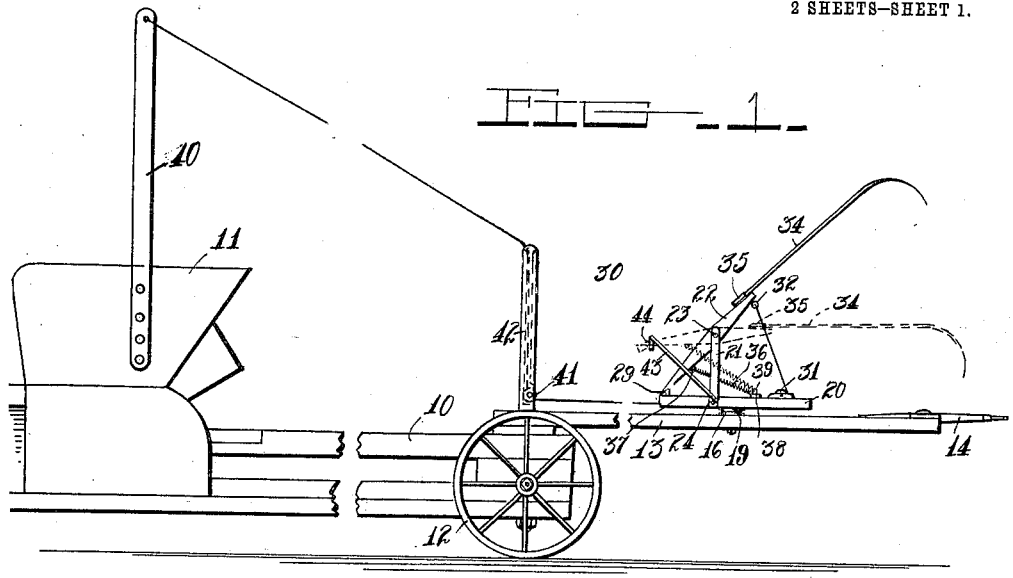
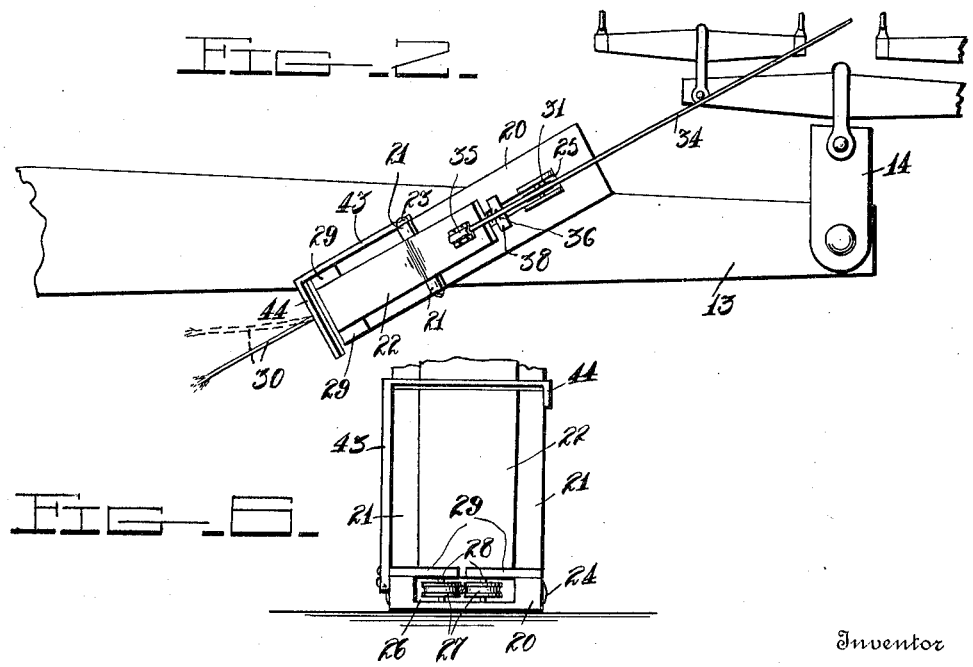
Witnesses
W. C. Fielding
John S. Burch
Inventor
H. Brown.
By
Attorneys

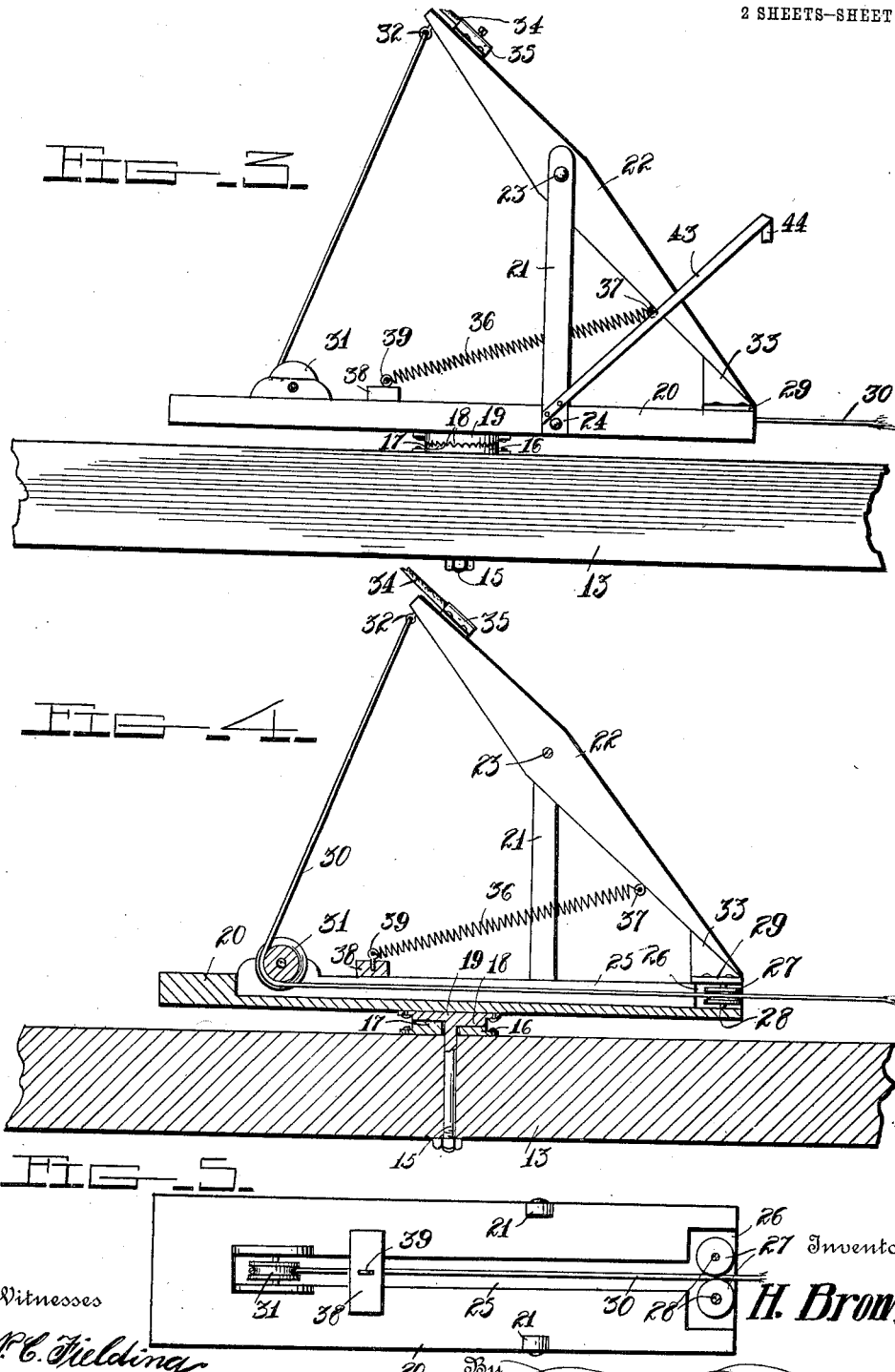

UNITED STATES PATENT OFFICE.

HARRY BROWN, OF ELVASTON, ILLINOIS.

POWER-WHIP FOR HAY-PRESSES.

1,029,586.  Specification of Letters Patent.  Patented June 18, 1912.

Application filed July 11, 1911. Serial No. 637,956.

*To all whom it may concern:*

Be it known that I, HARRY BROWN, a citizen of the United States, residing at Elvaston, in the county of Hancock, State of Illinois, have invented certain new and useful Improvements in Power-Whips for Hay-Presses; and I do hereby declare the following to be a full, clear, and exact description of the invention, such as will enable others skilled in the art to which it appertains to make and use the same.

This invention relates to whipping devices and more especially to a power whip for hay presses or the like.

A specific object of the invention is to provide an improved whipping device of novel construction which can be simply and readily actuated to obviate the use of a driver for the horses independent of the attendant to the machine.

Another object of the invention is the provision of a novel and simple form of whipping device which is especially adapted to be applied or supported upon the draft tongue of a baling press of the wheeled type or similar vehicles so that the whip may be positioned or turned to operate when the animals are moving in different directions.

With above and other objects in view the invention consists of certain other combinations and arrangements of parts as will be hereinafter more fully described and claimed, it being a still further object to provide a device which will not be likely to get out of working order.

In the drawings:—Figure 1 is a side elevation of a portion of a hay press of the wheeled type with my improved power whip mounted upon the draft tongue and connected for operation by the attendant to the machine. Fig. 2 is a plan view of a portion of the draft tongue with the invention applied thereto and extending in a direction toward the animals to illustrate the manner of pivoting the whipping device. Fig. 3 is an enlarged side elevation of the invention. Fig. 4 is a central longitudinal sectional view thereof. Fig. 5 is a plan view of the whipping device with the rock lever for holding the whip removed. Fig. 6 is a fragmentary end view thereof looking toward the rear end of the whipping device.

Referring to the drawings in detail, there is shown my improved power whip or whipping device as applied to a hay press 10, the latter of which is provided with the usual feed hopper 11 over which the attendant stands in feeding the hay for the baling operation, said press being supported upon the ground wheels 12 the forward wheels only being shown. A draft tongue 13 is connected to the front truck of the vehicle and is provided with the usual draft attaching means or double-tree 14 which is preferably capable of being extended to either side of the tongue for use in advancing the machine in either direction and adapted for coöperation with my improved whipping device now to be described.

A bolt member 15 is secured through the tongue 13 at a proper point and at its upper end carries a circular plate 16 having radial notches 17 coacting with similar notches 18 upon a plate 19 which is also mounted upon said bolt 15 so that a base member 20 for supporting the whipping device or mechanism thereof may be extended to operate upon either side of the tongue 13 in the manner illustrated in Fig. 2 of the drawings. The base member 20 comprises a rectangular member upon opposite sides of which vertically extended and spaced parallel uprights 21 are secured at their lower ends and adapted to pivotally support a rock lever 22 at their upper ends and between the same upon a connecting bolt 23 forming a pivot therefor and said rock lever is preferably tapered toward its ends and has its rearwardly extended arm of greater length than the forwardly extended arm so as to assist in its movement downward to an initial operating position. As before mentioned, the plate 16 which is mounted upon the bolt 15 is also adapted to be secured to the tongue against rotation while the plate 19 is secured as shown to the underface of the base 20 against rotation, the uprights being secured to the base as shown at 24. The base member 20 is further provided with a central longitudinal groove 25 extending from a point slightly spaced from its forward end to and communicating with its rear end and enlarged side slots 26 formed in said rear end for the mounting of a pair of pulleys 27 for rotation in a horizontal plane upon the vertical shafts 28. These pulleys are protected by cover plates 29 secured to the upper portion of the base and which are spaced apart centrally to permit the application of a flexible cable or connection 30 between the pulleys 27, said cable extending through the groove and around a pulley 31 rotatably supported partially within the groove 25 adjacent its forward end and having its free end attached to a ring 32 secured to the extremity of the shorter arm of the rock lever 22. The opposite extremity of the lever or the extremity of its longer arm carries a weighted block 33 for normally returning the lever with the whip 34 engaged in the whip socket 35, in a raised position, this action being assisted by an elastic member or coiled spring 36 which is secured to the longer arm of the lever by a ring 37 adjacent to the block 33 and has its opposite extremity attached to an anchoring block 38 secured to the upper face of the base and spanning the slot 25 as shown. The latter connection is accomplished by means of a ring 39 similar to the rings 32 and 37 heretofore described and it will be seen that when the whip 34 is engaged in the socket 35, the latter of which is preferably of the locking type, the spring will exert downward pull upon the longer arm of the lever in connection with the weight 33 to extend the cable 30 and freely move the same between the pulleys 27 and around the pulley 31. The use of the pulleys 27 is to permit the cable to be extended at its free extremity to either side of the base in the manner shown in Fig. 2 of the drawings so that the same may also be connected to an upright 40 and through a pulley 41 carried by an upright 42 so as to dispose the same for convenient operation of the attendant to the press and who can operate the same by simply exerting a pull upon the cable 30 to raise the seated end of the lever and to throw the whip downwardly for whipping or lashing the draft animals.

In order to assist in the operation of the whip so as to snap the same for better effect upon the animals, I provide an arm 43 which is secured to one of the uprights 21 at its lower end and extends upwardly in an inclined direction toward the longer arm of the lever and is provided with a downwardly extending curved hook 44 at its upper extremity so as to engage the longer arm of the lever 22 to limit the movement of the arm and bring the same to a sudden stop and further serving to make the whip strike hard. When this operation is carried on, the block 33 and the elastic connection 36 will return the whip to a raised position for another operation and thus the whip will at all times be in position for operation by the attendant to the hay press without requiring a driver.

From the foregoing description in connection with the accompanying drawings it will be seen that I have provided a power whip or whipping device which while especially adaptable for use upon hay presses or the like can be positioned upon vehicles in general and will be found very efficient for the purpose intended. The device is also extremely simple in construction and is thereby rendered durable in use and economical to manufacture.

I claim:—

1. In a power whip, the combination with a draft member and draft attaching means adapted to be extended to either side thereof; of a base member rotatably supported on the draft member and adapted to be held in an adjusted position independent of the draft member, a pivoted lever supported upon the base member, means for normally retaining the lever with its forward end upwardly, a whip carried by the forward end, means for moving said lever to an opposite position for actuating the whip and means for limiting the return movement of the lever to its initial position.

2. In a power whip, the combination with a draft member; of a base member swivelly mounted thereon, a whipping mechanism supported on said base member and means for actuating the whipping member, said base being capable of being held in an adjusted position.

3. In a power whip, the combination with a draft member; of a base member swivelly mounted thereon, a whipping mechanism supported on said base member and means for actuating the whipping member, said base being capable of being held in an adjusted position, said whipping device being disposed in a normally raised position and adapted to be lowered when operated.

4. In a power whip, a base, vertical uprights carried by the base and spaced apart, a rocking lever pivoted between the upper ends of the uprights to one side of the center thereof to provide a long and short arm, a weight carried by the long arm, an elastic connection between the longer arm and base for holding the same downward in connection with the weight, a whip member extending from the opposite extremity and normally raised and a cable connected to said extremity and extending rearwardly for lowering the same.

5. In a power whip, a base, vertical uprights carried by the base and spaced apart, a rocking lever pivoted between the upper ends of the uprights to one side of the center thereof to provide a long and short arm, a weight carried by the long arm, an elastic connection between the longer arm and base for holding the same downward in connection with the weight, a whip member extending from the opposite extremity and normally raised, said base having a longitudinal groove, pulleys mounted in the extremities of said groove, a cable secured to the extremity of the shorter arm of the lever and adapted to pass around said pulley and means to limit the upward movement of the longer arm when the lever is actuated.

In testimony whereof, I affix my signature, in presence of two witnesses.

HARRY BROWN.

Witnesses:
 GEO. L. COSLEY,
 FRED BROWN.

Copies of this patent may be obtained for five cents each, by addressing the "Commissioner of Patents, Washington, D. C."